3,219,422
EXTRACTION OF ALKALINE EARTH METAL
VALUES USING LIQUID ION EXCHANGER
David A. Ellis, Pleasant Hill, Calif., assignor to The Dow Chemical Company, Midland, Mich., a corporation of Delaware
Filed May 1, 1963, Ser. No. 277,223
7 Claims. (Cl. 23—312)

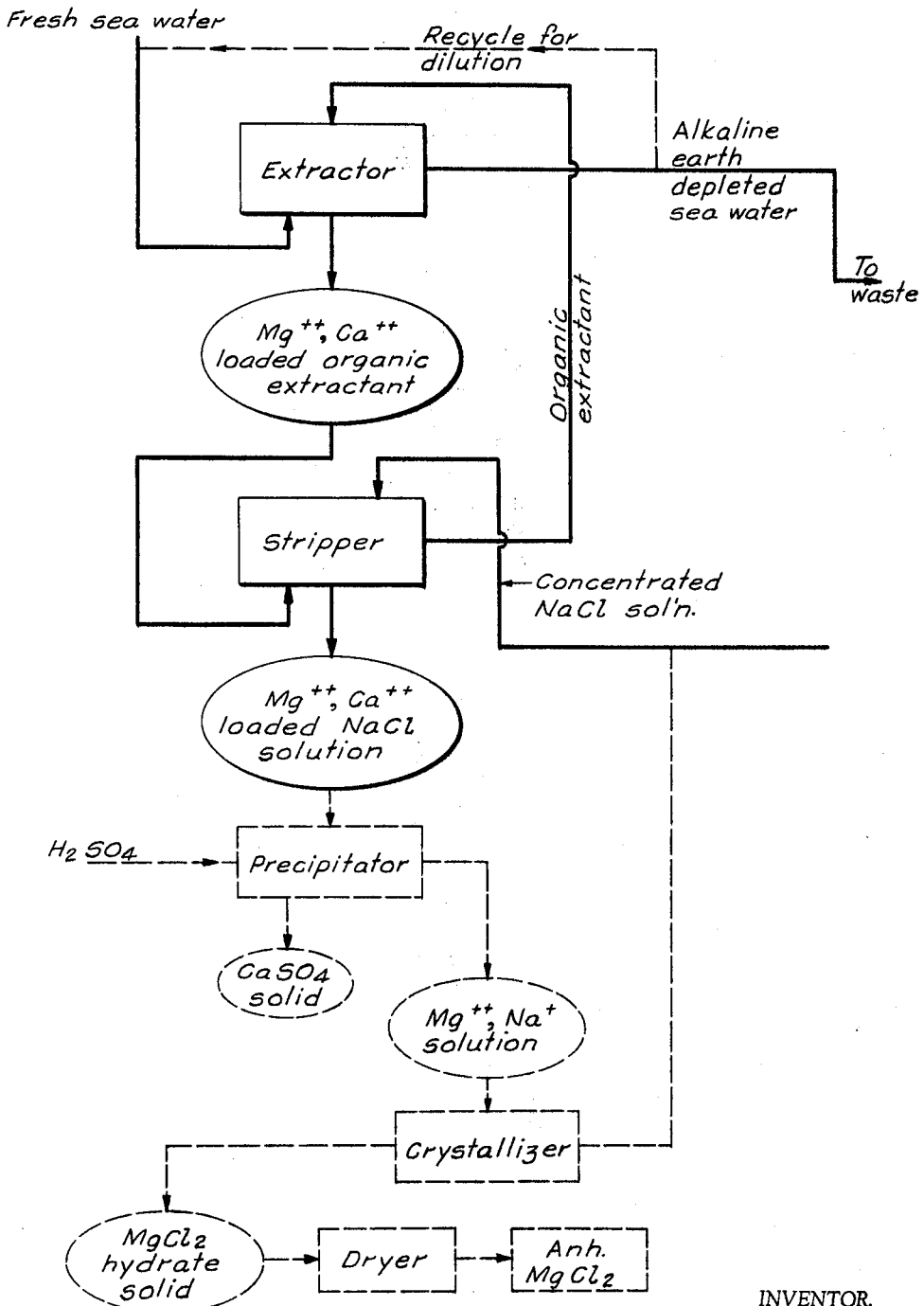

The present invention relates to a novel process for recovering metal values dissolved in an aqueous solution and more particularly is concerned with a process for recovering alkaline earth metals dissolved in aqueous electrolyte solutions. The term alkaline earth metal as used hereinafter is meant to include magnesium.

Conventional processes presently employed for recovering or removing these metal values from sea water, well brines, "hard" ground waters, industrial brines, plant waste streams and the like, for example, involve chemical precipitation, ion exchange techniques and evaporative concentration procedures. Disadvantages of such traditional processes include the need for removing excessive amounts of liquid (evaporation) or serious losses of expensive treatment materials (ion exchange resin).

It is a principal object of the present invention to provide a novel process for recovering or removing alkaline earth metal values dissolved in an aqueous medium using liquid-liquid extraction.

It is another object of the present invention to provide a commercially practical method for separating alkaline earth metal values from aqueous solutions containing these substances.

It is a further object of the present invention to provide a novel method for alkaline earth metal value recovery wherein the reagents can be recycled for reuse.

An unexpected advantage of the method of the invention is that calcium extraction coefficients (ratio of cation concentration in organic extraction employed to concentration in brine) are several times higher than the coefficients for magnesium. Thus, not only can magnesium and calcium be simultaneously removed from brines, for example, but these metal values readily can be separated from each other by subsequent extraction operations.

These and other objects and advantages will become apparent from the detailed description presented hereinafter when read in conjunction with the accompanying drawing.

The figure of the drawing depicts one embodiment of the present process showing the removal of calcium and magnesium values from sea water.

In accordance with the present process, a solution containing alkaline earth metal values is contacted with a substantially water-immiscible, organic liquid containing at least one functional group selected from the group consisting of alkali metal sulfonate and alkali metal sulfate thereby to extract the alkaline earth metal values into the organic phase. Ordinarily the organic extractant is carried in an inert substantially water immiscible organic liquid. The metal value loaded organic extractant and alkaline earth depleted aqueous phase are separated and the metal values then stripped or otherwise removed from the organic extract.

The ratio of organic phase to metal containing aqueous solution to be employed ranges from about 0.1 to about 10, preferably from about 0.2 to about 5, based on the total volume of organic phase to aqueous solution.

Ordinarily organic extractant solutions containing from 5 to about 30 percent or more of the extractant dissolved in a substantially water immiscible, inert organic solvent member are employed. Preferably organic solutions containing from about 5 to about 15 weight percent of the extracting agent in the solvent are utilized. The present method is not limited by these upper concentration values as more concentrated solutions can be used. However, as the solution concentration is increased to higher levels, the viscosity of the organic phase increases thereby introducing additional power requirements and special techniques for pumping and handling the solution. At organic solution concentrations much below about 5% extractant, unwieldly volumes of solution can result.

The extraction times to be employed are not critical. However, in general, for any given extractant solution the rate of metal value recovery is directly proportional to the contact time. Ordinarily contact time for a batch process, i.e. non-continuous operation, or time at any given stage in continuous operation, ranges from several seconds, e.g. about 5 seconds, to about 10 minutes or more.

Reaction temperatures utilized are those above the freezing point of the system and below the boiling point. Ordinarily these are dictated by the organic solvent employed for the extractant. Usually the process is carried out over a temperature range of from about 0 to about 120° C.

Parameters of present process can be illustrated by one example wherein calcium and magnesium values were extracted from sea water by contacting the aqueous phase with a 10 percent weight solution of sodium dinonyl naphthalene sulfonate in kerosene at organic to aqueous volume phase ratios of from about 1 to about 2 for about 3 minutes. These conditions, of course, are not meant to be limiting but merely are illustrative.

The alkaline earth metal values can be removed or recovered from the organic extractant by a variety of stripping solutions or precipitating agents.

To illustrate, the metal values can be stripped and recovered from the organic extract by contacting this metal value containing solution with a substantially saturated alkali metal chloride or ammonium chloride solution or a concentrated alkali metal chloride which has been acidified with aqueous hydrochloric acid. Acidified sodium chloride brines are preferred as stripping solutions since these provide for high distribution coefficients and a high stripping rate. Saturated sodium chloride acidified with up to about 5 moles hydrogen chloride per liter is especially desirable. The metal values can be recovered from the aqueous strip solution by direct precipitation as the corresponding insoluble salts or by fractional crystallization.

Alternatively, the metal values can be precipitated directly from the organic solution. Direct precipitation of the alkaline earth metal values from the loaded organic extractant is obtained by treating the extract with at least one material selected from the group consisting of aqueous sulfuric acid, oxalic acid, tartaric acid, the sodium and potassium salts of oxalic and tartaric acids, alkali metal carbonates, alkali metal sulfites, ortho phosphoric acid, citric acid, hydrofluoric acid, gaseous hydrogen chloride, aqueous hydrochloric acid, aluminum sulfate, mineral acid, acidified aluminum sulfate and the like.

The alkali metal sulfonate and alkali metal sulfate containing organic liquid extractants preferably employed in the instant process are:
 (I) Alkyl aryl sulfonates—$R_mAr(SO_3M)_x$
 (II) Alkyl sulfates—$R(SO_4M)_x$
 (III) Alkyl sulfosuccinates—

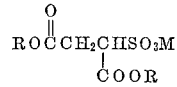

(IV) Petroleum sulfonates—$R(SO_3M)_x$ wherein,

R is a non-aromatic hydrocarbon radical having from about 8 to about 50 carbon atoms, Ar is an aromatic hydrocarbon radical selected from the group consisting of phenyl and naphthyl, $m$ is an integer ranging from 1 to about 3, $x$ is an integer of 1 or 2, and M is an alkali metal.

The organic extractant to be employed in the present process should have a solubility of at least about 5 weight percent in the organic solvent member and preferably have a maximum solubility in water of about one percent by weight. Further, it is to be understood that the organic extractant can contain polar substituent radicals such as halide, hydroxyl, thiol, alkoxy, thioalkoxy, carbonyl, ester, amino, nitrile and nitro groups, for example, the number and character of such substituent groups being limited only to the extent that they do not detrimentally (1) decrease the water insolubility of the extractant or (2) decrease the solubility of the extractant in the organic solvent. Also the functional group should not react unfavorably during the extraction and stripping stages of the process. Additionally olefinic double bonds can be included in the hydrocarbyl radicals of the organic extractant provided that these do not render the material undesirably reactive.

Generally, any substituent groups, if present in the organic extractant molecule, are present only at a relatively low group/carbon atom ratio and usually these are spatially relatively remote from the active sulfate or sulfonate group of the extractant.

Although a straight chain carbon skeleton is preferred in the extractant, branched chain or alkyl substituted cycloalkyl configurations are also suitable. Inclusion of one or two oxygens in the skeleton, rather than merely as in alkoxy or thioalkoxy substituents thereon is permissible within the restrictions supra.

Suitable water-immiscible organic solvents for the practice of the invention are exemplified by benzene, chloroform, hexane and the like liquid aliphatic hydrocarbons, 2-ethyl heptane and the like branched chain liquid aliphatic hydrocarbons, carbon tetrachloride, chloro-substituted aliphatic, alicyclic and cyclo aliphatic hydrocarbons, kerosene and like petroleum distillates, toluene, xylene and the like aromatic hydrocarbons.

The figure provides a schematic diagram of one embodiment of the present process illustrating the recovery of calcium and magnesium from sea water, a typical application of the practice of this invention. Sea water, optionally diluted with a portion of fresh water or recycled sea water raffinate, is contacted in a mixer-settler extractor in countercurrent flow with a water-immiscible organic extractant of the present invention dissolved in an inert solvent. The alkaline earth metal-depleted sea water is discarded to waste or partially recycled. The metal-laden organic extractant phase is then sent to a stripper where it is contacted and stripped with a concentrated sodium chloride solution, which can be acidified with gaseous hydrogen chloride, if desired. The alkaline earth metal values are extracted into the sodium chloride solution. The stripped organic phase is returned in recycle fashion for further extraction of additional sea water. If it is desired to further separate the calcium and magnesium values, the solution containing magnesium-, calcium-, and sodium chlorides, can be treated with sulfuric acid as shown to selectively precipitate calcium sulfate which is removed by suitable filtration means. The residual solution containing the magnesium values can be separated from the sodium chloride solution by fractional crystallization. This product can be further purified and dried by ordinary means well known to those skilled in the chemical arts.

The present process can be carried out in batch type processes, cyclic or continuous operation. Reactors and material handling and storage equipment is to be constructed from materials that are not detrimentally attacked by the reactants and which have the required structural and strength requirements.

The invention is illustrated by, but is not to be construed as limited to the following examples.

EXAMPLE I

A solution of $SrCl_2 \cdot 6H_2O$ dissolved in 2 molar aqueous sodium chloride was made up to a strontium content of one gram per liter. The solution was shaken vigorously for 15 minutes with an equal volume of a 10% by weight solution of sodium dinonyl naphthalene sulfonate in kerosene. The organic and aqueous phases were allowed to separate and were analyzed for strontium content by flame photometry. The ratio of organic to aqueous phase contents of strontium per unit volume was found to be 0.43.

EXAMPLE 2

A solution 2.14 molar in $HNO_3$, 0.0094 molar in $SrCl_2 \cdot 6H_2O$, 0.037 molar in $Al(NO_3)_3 \cdot 9H_2O$, and 0.018 molar in $Fe(NO_3)_3$ was made up in water. This solution simulates the liquor obtained from nitric acid leaching of spent stainless steel clad reactor fuel elements.

The bulk of the ntitric acid was removed by treating the solution with 20% didodecyl amine in kerosene at an organic/aqueous phase ratio of about 6. The substantially nitric acid free aqueous phase was then extracted at 1:1 volume ratio with a 10% by weight solution of sodium dinonyl naphthalene sulfonate in kerosene solution. The ratio of strontium values in the organic to aqueous phases was found to be 2.43. The resulting moist, strontium loaded organic extract solution upon stirring with 1.1 gram moles of $Na_2CO_3$ per gram ion of strontium ion present forms a solid precipitate of $SrCO_3$ which readily is separable from the organic phase.

EXAMPLE 3

Aliquots of an aqueous solution 0.1 molar in $BaCl_2$ and 1.0 molar in $NaCl_2$ in water were extracted for five minutes each at increasing phase ratios with 10% by weight solution of sodium dinonyl naphthalene sulfonate in kerosene. The barium content of each aqueous raffinate was gravimetrically determined (as $BaSO_4$). The barium contents of the organic phases and the corresponding extraction coefficients were then calculated. The results are summarized in Table I which follows:

*Table I*

| | Phase Ratio, Organic/Aqueous | | | | | | | |
|---|---|---|---|---|---|---|---|---|
| | 20 ml./200 | | 25/50 | | 50/50 | | 200/40 | |
| Phases | Org. | Aq. | Org. | Aq. | Org. | Aq. | Org. | Aq. |
| $Ba^{++}$ Assay (grams/liter) | (9.8) | 8.42 | (6.7) | 6.06 | (5.5) | 3.86 | (1.7) | 0.78 |
| K (o/a) | 1.16 | | 1.10 | | 1.42 | | 2.2 | |

EXAMPLE 4

A number of organic extractant solutions as listed in Table II were used to extract calcium and magnesium from sea water. In each test the extractant solution was mechanically shaken at room temperature with sea water for 15 minutes. The phases were allowed to separate and were sampled for analysis by titration. The results of these tests also are summarized in Table II.

effluent dropped steadily from an initial value of ~0.1 equivalent/liter to a low of ~0.08 eq./l. at 8 hours, and rose again thereafter. The calcium content dropped from an initial value of ~0.02 eq./l. to an apparent steady state value of ~0.01 eq./l. within about 8½ hours. The magnesium content of the aqueous raffinate dropped steadily from an initial value of 0.003 eq./l. to a final value of 0.0003 eq./l. The raffinate content of Ca

Table II

[Extraction of Sea Water Containing 0.0998 Equi./Liter Mg²⁺ and 0.0195 Equi./Liter Ca²⁺]

| Extraction Solution | | Solvent | Volume Ratio | | Equivalents per Liter | | | |
|---|---|---|---|---|---|---|---|---|
| | | | | | Mg²⁺ | | Ca²⁺ | |
| Extractant | Conc. | | Organic | Aqueous | Organic | Aqueous | Organic | Aqueous |
| Sodium heptadecyl sulfate | 0.56 Molar | Benzene | 0.5 | 1 | .0708 | .0644 | .0296 | .0047 |
| | | | 1 | 1 | .0503 | .0495 | .0119 | .0076 |
| | | | 2 | 1 | .0289 | .0420 | .0065 | .0065 |
| Sodium alkyl naphthalene sulfonate. | 0.16 Molar | Kerosene | 0.2 | 1 | .0180 | .0962 | .0085 | .0178 |
| | | | 0.5 | 1 | .0268 | .0864 | .0098 | .0146 |
| | | | 1 | 1 | .0444 | .0554 | .0124 | .0071 |
| | | | 2 | 1 | .0317 | .0363 | .0077 | .0041 |
| | | | 5 | 1 | .0160 | .0198 | .0034 | .0025 |
| Sodium bis(2 ethylhexyl) sulfosuccinate. | 0.20 Molar | do | 0.2 | 1 | .0370 | .0928 | .0175 | .0159 |
| | | | 0.5 | 1 | .0376 | .0814 | .0152 | .0118 |
| | | | 1 | 1 | .0319 | .0683 | .0105 | .0089 |
| | | | 2 | 1 | .0242 | .0518 | .0068 | .0057 |
| | | | 5 | 1 | .0119 | .0413 | .0029 | .0048 |
| Sodium dinonyl naphthalene sulfonate. | 0.11 Molar | do | 0.1 | 1 | .0157 | .0444 | .0193 | .0121 |
| | | | 0.2 | 1 | .0185 | .0440 | .0126 | .0099 |
| | | | 1 | 1 | .0164 | .0298 | .0082 | .0051 |
| | | | 5 | 1 | .0063 | .0102 | .0026 | .0016 |

EXAMPLE 5

Multistage extraction of sea water was carried out in a laboratory countercurrent extraction apparatus consisting of 4 glass mixer-settler stages. The mixers were 1.5 inches in diameter and 3 inches high and the settlers were 1.5 inches in diameter and 5 inches high. When running full, each mixer contained about 60 ml. of solution and each settler contained about 150 ml. The mixers were agitated by glass turbine type stirrers rotated by variable speed electric motors.

Each mixer was connected to its corresponding settler with two ½ inch openings so positioned that continuous feed back of the organic phase from the settler to the mixer could take place through the upper connection while suspension moved from the mixer to the settler through the lower arm. The stages were positioned so that the organic stream flowed by gravity from the last to the first stage. The aqueous stream was lifted between stages by air lifts. The air lifts were positioned to serve as overflow legs to control the level of the interface in the settlers. The interface level in each stage was adjusted so that approximately equal volumes of the aqueous and organic phases were present in the mixers.

Each stream was pumped and controlled by a constant-flow pump. Both syringe pumps and Brosites pumps were used. Flow rates were monitored by collecting measured volumes of solution at intervals during each run.

A run was made in the unit with sea water diluted with an equal volume of fresh water and 10% by weight sodium dinonyl naphthalene sulfonate in kerosene extractant at flow rates of 2.1 ml. of organic phase and 5.7 ml. aqueous phase per minute, i.e. an organic/aqueous volume ratio of about 0.37. The unit was operated for 12 hours. The residence time of the organic phase was about 15 minutes in each mixer and in each settler. The residence time of the aqueous phase was 5 to 6 minutes in the mixer and about 20 minutes in the settler. During the run, periodic samples of both the raffinate and the loaded organic phase were taken for Mg and Ca analyses. It was found that the magnesium content of the organic dropped from an initial value of 0.004 eq./l. to an apparent steady state of 0.001 eq./l. after about 8 hours.

The metal values readily were recovered from the organic phase by the treatment with the stripping or precipitating agents set forth herein.

EXAMPLE 6

A well brine containing 7% $MgCl_2$ and 5% $CaCl_2$ is vigorously mixed for about five minutes with a solution containing 5% by weight sodium dinonyl naphthalene sulfonate in kerosene. The organic phase is allowed to separate, withdrawn and colorimetrically analyzed for water content. Sufficient benzene then is added to permit removal of the water by azeotropic distillation and still leave a slight excess of benzene. The loaded organic extractant solution is distilled essentially free of benzene and water and the bottoms product gassed with anhydrous HCl in a moisture-free system until precipitation of magnesium and calcium chlorides is complete. The chlorides are separated from the resultant kerosene solution of dinonyl naphthalene sulfonic acid. The mixed anhydrous chlorides are found not to include more than 5% NaCl.

In a manner similar to that described for the preceding examples satisfactory extraction of alkaline earth metal values from aqueous solutions can be achieved with the following organic extractants:

(1)

(2)

(3) $C_{50}H_{101}(SO_4Na)_2$ (4) $C_{30}H_{61}(SO_3Li)$ (5) $C_{20}H_{41}(SO_3Na)_2$

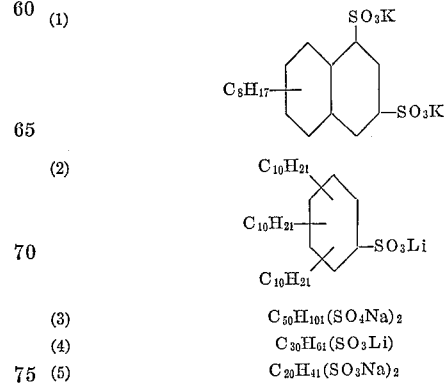

Also, it is to be understood that other alkyl aryl sulfonates, alkyl sulfates, alkyl sulfosuccinates and petroleum sulfonates as set forth hereinbefore can be employed in the present novel process.

Various modifications can be made in the present invention without departing from the spirit or scope thereof for it is understood that I limit myself only as defined in the appended claims.

I claim:
1. A process for extracting alkaline earth metal values dissolved in an aqueous solution which comprises;
   (1) contacting said solution with a substantially water-immiscible liquid organic extractant formed by the addition of a liquid water-immiscible exchange material selected from the group consisting of (I) alkyl aryl sulfonates, (II) alkyl sulfates, (III) alkyl sulfosuccinates and (IV) petroleum sulfonates corresponding respectively to the empirical formulae

(I) $\quad R_m Ar(SO_3M)_x$
(II) $\quad R(SO_4M)_x$
(III) 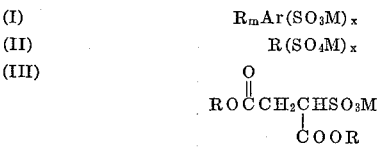
and
(IV) $\quad R(SO_3M)_x$ wherein R is a non-aromatic hydrocarbon radical having from about 8 to about 50 carbon atoms,
Ar is an aromatic hydrocarbon radical selected from the group consisting of phenyl and naphthyl,
$m$ is an integer ranging from 1 to about 3,
$x$ is an integer of 1 or 2, and
M is an alkali metal, dissolved in a water immiscible organic solvent thereby to extract said alkaline earth metal values into said liquid organic extractant, said substantially water-immiscible organic extractant being further characterized as being a liquid and exhibiting a solubility of at least about 5 weight percent in a water-immiscible organic solvent,
   (2) separating the metal containing organic extraction liquid from said aqueous phase, and
   (3) recovering the alkaline earth metal values from said liquid organic extractant.

2. The process as defined in claim 1 and including the step of recycling the metal depleted liquid organic extractant to contact additional alkaline earth metal containing aqueous solution.

3. The process as defined in claim 1 wherein the liquid organic extractant is carried in an inert, substantially water immiscible liquid organic solvent for said extractant, the concentration of said liquid extractant in said solvent ranging from about 5 to about 30 weight percent.

4. The process as defined in claim 3 wherein the ratio of the total volume of organic phase to the volume of the aqueous alkaline earth metal solution ranges from about 0.1 to about 10.

5. A process for removing and recovering alkaline earth metal values dissolved in an aqueous solution which comprises;
   (a) contacting for a minimum period of time of about 5 seconds and at a temperature of from about 0 to about 120° C. said aqueous solution containing said alkaline earth metal values with a solution of sodium dinonyl naphthalene sulfonate in kerosene, said kerosene solution containing from about 5 to about 15 weight percent of said dinonyl naphthalene sulfonate, the ratio of the total volume of said solution of said organic extractant to said aqueous alkaline earth metal value containing solution ranging from about 0.2 to about 5, thereby to extract alkaline earth metal values into said organic extractant solution, and
   (b) separating the organic and aqueous phases, and
   (c) recovering said alkaline earth metal values from the alkaline earth metal value loaded organic extractant.

6. The process as defined in claim 5 and including the step of treating the alkaline earth metal loaded organic extractant solution with a saturated solution of sodium chloride containing a maximum of about 5 moles hydrogen chloride per liter thereby to recover said alkaline earth metal values from said organic extractant solution.

7. A process for recovering calcium and magnesium values from sea water which comprises;
   (a) contacting sea water with about a 10 percent by weight solution of sodium dinonyl naphthalene sulfonate in kerosene at an organic phase/aqueous phase volume ratio of about 0.4,
   (b) separating the calcium and magnesium loaded organic phase and aqueous phase, and
   (c) recovering the alkaline earth metal values from the organic phase.

References Cited by the Examiner

UNITED STATES PATENTS 2,897,051   7/1959   McIlhenny.
3,074,820   1/1963   Kunin.
3,123,553   3/1963   Abrams.

OTHER REFERENCES

Surface Active Agents, Schwartz & Perry, Interscience Publishers, Inc., New York, 1949, pp. 116–129.

Bodamer: "Behavior of Ion Exchange Resins in Solvents Other Than Water," Industrial and Eng. Chem., vol. 45, #11, 1953, pp. 2577–2578.

"Permutit Ion Exchangers," Bulletin 2508-260-2m Permutit Co., 1953, pp. 1–9.

NORMAN YUDKOFF, *Primary Examiner.*